(12) United States Patent
Kamath et al.

(10) Patent No.: US 9,992,308 B2
(45) Date of Patent: Jun. 5, 2018

(54) HISTORICAL SUMMARIZATION IN A PROCESS CONTROL ENVIRONMENT

(71) Applicant: Invensys Systems, Inc., Foxboro, MA (US)

(72) Inventors: Vinay T. Kamath, Rancho Santa Margarita, CA (US); Dave Tran, Rancho Santa Margarita, CA (US); Abhijit Manushree, Laguna Niguel, CA (US); Elliott Middleton, Tyler, TX (US); Bala Kamesh Sista, Irvine, CA (US); Steven Michael Weinrich, York, PA (US)

(73) Assignee: Schneider Electric Software, LLC, Lake Forest, CA (US)

( * ) Notice: Subject to any disclaimer, the term of this patent is extended or adjusted under 35 U.S.C. 154(b) by 215 days.

(21) Appl. No.: 14/970,062

(22) Filed: Dec. 15, 2015

(65) Prior Publication Data

US 2016/0173649 A1 Jun. 16, 2016

Related U.S. Application Data

(60) Provisional application No. 62/092,057, filed on Dec. 15, 2014.

(51) Int. Cl.
*G06F 15/16* (2006.01)
*H04L 29/06* (2006.01)
*H04L 29/08* (2006.01)
*G06Q 10/06* (2012.01)

(52) U.S. Cl.
CPC ............. *H04L 67/42* (2013.01); *G06Q 10/06* (2013.01); *H04L 67/2842* (2013.01)

(58) Field of Classification Search
CPC ....... H04L 67/42; H04L 67/2842; G06Q 10/06
See application file for complete search history.

(56) References Cited

U.S. PATENT DOCUMENTS

| | | | | |
|---|---|---|---|---|
| 2003/0105535 A1* | 6/2003 | Rammler | ............. | G05B 19/409 |
| | | | | 700/17 |
| 2006/0020350 A1* | 1/2006 | Khanchin | ........ | G05B 19/41845 |
| | | | | 700/11 |
| 2009/0307627 A1* | 12/2009 | Adams | ................ | G06F 9/4443 |
| | | | | 715/781 |
| 2014/0371936 A1* | 12/2014 | Kamel | ............... | G01R 21/1333 |
| | | | | 700/291 |
| 2016/0116894 A1* | 4/2016 | Brennan | ............. | G05B 19/052 |
| | | | | 700/3 |

* cited by examiner

*Primary Examiner* — Richard G Keehn
(74) *Attorney, Agent, or Firm* — Senniger Powers LLP (57) ABSTRACT

A system for displaying statistical data in a process control environment. A client device connects, via a network, to a historian connection module, and subscribes, via the connection to the historian connection module, to statistical data stored in a historian server module. A historian device receives a connection, by the historian connection module via the network, from the client device, forms a connection between the historian connection module and the historian server module, receives a subscription, by the historian connection module via the network, to statistical data stored in the historian server module from the client device, and stores, by the historian connection module, the received subscription.

18 Claims, 7 Drawing Sheets

HISTORICAL SUMMARIZATION IN A PROCESS CONTROL ENVIRONMENT

CROSS-REFERENCE

This application claims the benefit of U.S. provisional patent application Ser. No. 62/092,057 filed Dec. 15, 2014, which is incorporated herein in its entirety by reference.

Co-pending, co-owned U.S. patent application Ser. No. 14/970,076, entitled Optimistic Data Retrieval in a Process Control Environment, filed on the same day as this application, and which claims the benefit of U.S. provisional patent application Ser. No. 62/092,059 filed Dec. 15, 2014, is incorporated herein in its entirety by reference. Co-pending, co-owned U.S. patent application Ser. No. 14/970,086, entitled Connection Based Bandwidth Optimization of Data Packets, filed on the same day as this application, and which claims the benefit of U.S. provisional patent application Ser. No. 62/092,063 filed Dec. 15, 2014, is incorporated herein in its entirety by reference.

BACKGROUND

Industry increasingly depends upon highly automated data acquisition and control systems to ensure that industrial processes are run efficiently, safely, and reliably while lowering their overall production costs. Data acquisition begins when a number of sensors measure aspects of an industrial process and periodically report their measurements back to a data collection and control system. Such measurements come in a wide variety of forms. By way of example, the measurements produced by a sensor/recorder include: temperature, pressure, pH, and mass/volume flow of material, as well as a tallied inventory of packages waiting in a shipping line and/or a photograph of a room in a factory. Storing and analyzing gathered process data is an important part of running an efficient process and the ability to view information gleaned from the data after processing in a clear way is vital to being able to make educated decisions about managing the process.

SUMMARY

Briefly, aspects of the present invention relate to the storage, processing, and display of the gathered process data. Further aspects involve storing process data on a server and accessing it on a client device. The data may be processed in such a way as to be presented as summary information pertaining to a particular aspect of the process.

In one aspect, a system is described for displaying statistical data in a process control environment comprising a client device comprising a first memory storage device, a first processor, and a display device and a historian device comprising a second memory storage device and a second processor. The client device comprises instructions for connecting, via a network, to a historian connection module, subscribing, via the connection to the historian connection module, to statistical data stored in a historian server module, activating, via the connection to the historian connection module, the statistical data to which the client device is subscribed, refreshing, via the connection to the historian connection module, a data request for statistical data to which the client device is subscribed, and publishing statistical data on the display device. The historian device comprises a historian connection module and a historian server module. The historian device comprises instructions for receiving a connection, by the historian connection module via the network, from the client device, forming a connection between the historian connection module and the historian server module, receiving a subscription, by the historian connection module via the network, to statistical data stored in the historian server module from the client device, storing, by the historian connection module, the received subscription, receiving, by the historian connection module, an activation, from the client device via the network, of a data request for statistical data to which the client device is subscribed, receiving, by the historian connection module, a refresh data request from the client device via the network to refresh the statistical data to which the client device is subscribed, querying, by the historian connection module, the historian server module with at least one of the activation data request and refresh data request for statistical data to which the client device is subscribed, processing, by the historian server module, the query data request from the historian connection module, sending results from the processed data request from the historian server module to the historian connection module, and sending results from the processed data request from the historian connection module to the client device via the network.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Aspects of the present invention generally relate to the field of providing information about a process control environment to users in a useful way. A process control environment includes a facility or factory containing equipment that facilitates the automation of a process. In an embodiment, the process is for the manufacture or production of products, including goods for sale or ingredients for use in other processes or the like. Products produced are mechanical, chemical, or electrical in nature, or some combination thereof. The environment includes equipment necessary to facilitate the process, as well as equipment to automate the process. The equipment includes, for example, controllers for organizing and directing the other equipment in the process, actuators for physically or electrically causing actions directed by the controllers, sensors for gathering information about the process to provide feedback to the controllers, and the like. The process control environment according to embodiments of the invention includes interface devices that enable users to view information about the process and direct the behavior of the controllers and thereby, the behavior of the other equipment in the process. An interface device comprises, for example, a personal computer, server computer, mobile device, or the like.

Figure 1:
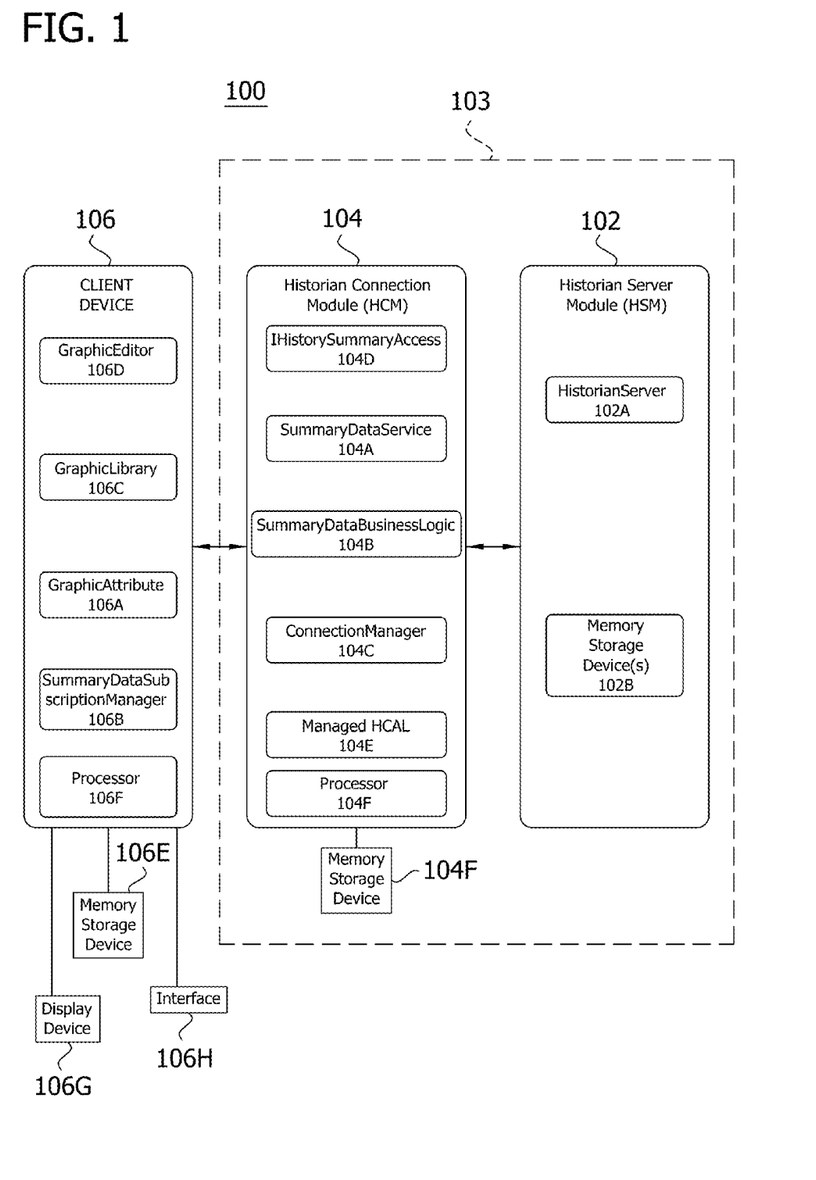
FIG. 1 is a block diagram of a client device and historian device and included modules.

In an embodiment, the process control system 100 includes a client device 106 and a historian device 103. FIG. 1 shows an exemplary block diagram of a relationship between the client device 106 and the historian device 103 including historian server module 102 and historian connection module 104 in the historian device 102. The client device 106 is, for example, a stationary computer or a mobile device. Preferably, the client device 106 comprises at least a memory storage device 106E, a processor 106 F, and a display device 106G. The client device 106 in an embodiment also includes an interface 106H through which a user may control the process or change the information that is being displayed on the display device 106G. The memory storage device 106E of the client device 106 contains processor-executable instructions for the operation of the client device 106. The processor 106F is configured to execute the instructions to cause the client device 106 to operate. The display device 106G can be any sort of device capable of displaying process information to a user. This could include a computer monitor, a touch screen on a mobile device, or the like.

The process control system 100 in the illustrated embodiment of FIG. 1 also includes a historian device 103. The historian device 103 is passed data that is gathered from the process for storage and processing. An important part of an effective process control system 100 is the analysis of data from the process in order to make educated decisions about how to improve the process. The historian device 103 comprises, for example, a historian server module (HSM) 102 that stores historical data for later use and analysis. The historian device 103 further comprises, for example, one or more memory storage devices 102B, 104F that store the historian data gathered from the process and processer-executable instructions and one or more processors such as processor 104E and/or a historian server 102A for executing the instructions. In turn, the processor-executable instructions direct the operation of the historian device 103.

In an embodiment, the historian device 103 also comprises a historian connection module (HCM) 104. The historian connection module 104 behaves as an interface for connecting to and interacting with the historian device 103. The historian connection module 104 is connected via a network to other devices in the process control system 100, including the client device 106 as described above. The network connection may be over any type of communication network. The network may be either wired or wireless and either private or public. It may include use of the World Wide Web or other large network. Because the network connection is flexible, the historian connection module 104 is configured to connect to devices that are far removed from the location of the historian device 103. The historian device 103 and client device 106 could be in the same room, or on separate continents. The connection between the historian device 103 and client device 106 preferably connects in a typical manner of two devices connecting via a network.

Figure 2:
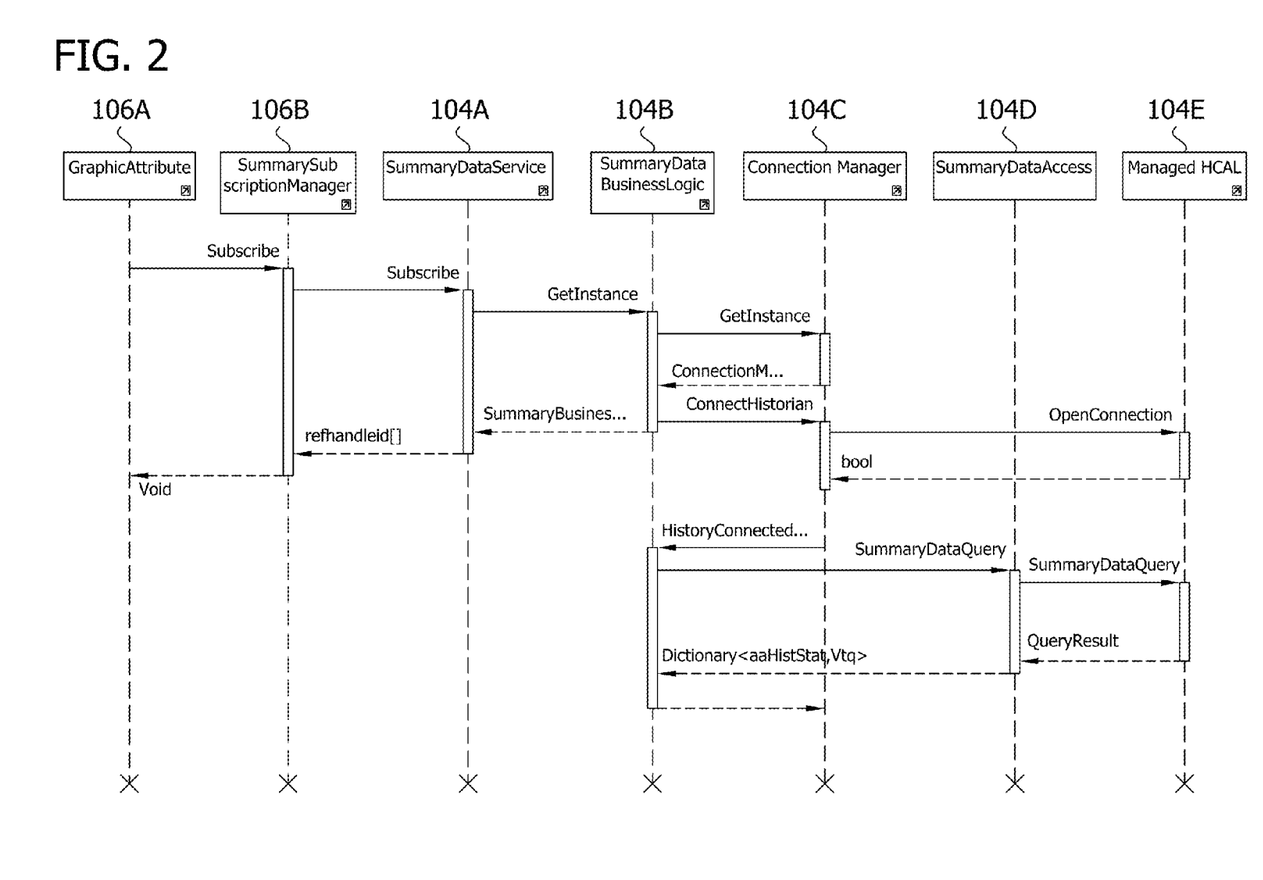
FIG. 2 is a sequence diagram of a subscription message being sent and processed.

In an embodiment, the client device 106 is programmed to display statistical information about the process on its display device 106G. The statistical information is stored by the historian device 103, or the data necessary to calculate the statistical information is stored, for example, by the historian device 103. In order to obtain the desired statistical data or information, the client device 106 subscribes to the statistical data by sending a subscription message to the historian connection module 104. FIG. 2 shows an exemplary sequence diagram of a subscription message being sent and processed. The historian connection module 104 in the illustrated embodiment receives the subscription message from a summary subscription manager 106B of the client. The message is based on graphic attributes as specified by a graphic attributes module 106A and is sent via the network. The graphic attributes are defined by a graphic library 106C as edited by user instructions provided via interface 106H to a graphics editor 106D. The historian connection module 104 stores the subscription message in a summary data service module 104A, keeping track of all the current subscriptions. According to an embodiment of the invention, a summary data business logic module 104B of the historian connection module 104 via a connection manager module 104C opens a connection with the historian server module 102 upon reception and storage of the subscription message. The connection is based on and defined by a summary data access module 104D and a client managed module 104E. The historian connection module 104 sends an initial query message to obtain the subscribed to data and the historian server module 102 responds to the query with results sent back to the historian connection module 104. The historian connection module 104 in the illustrated sequence records the received query results in a dictionary or cache of memory storage device 104F for use in responding to requests from the client device 106.

Figure 3:
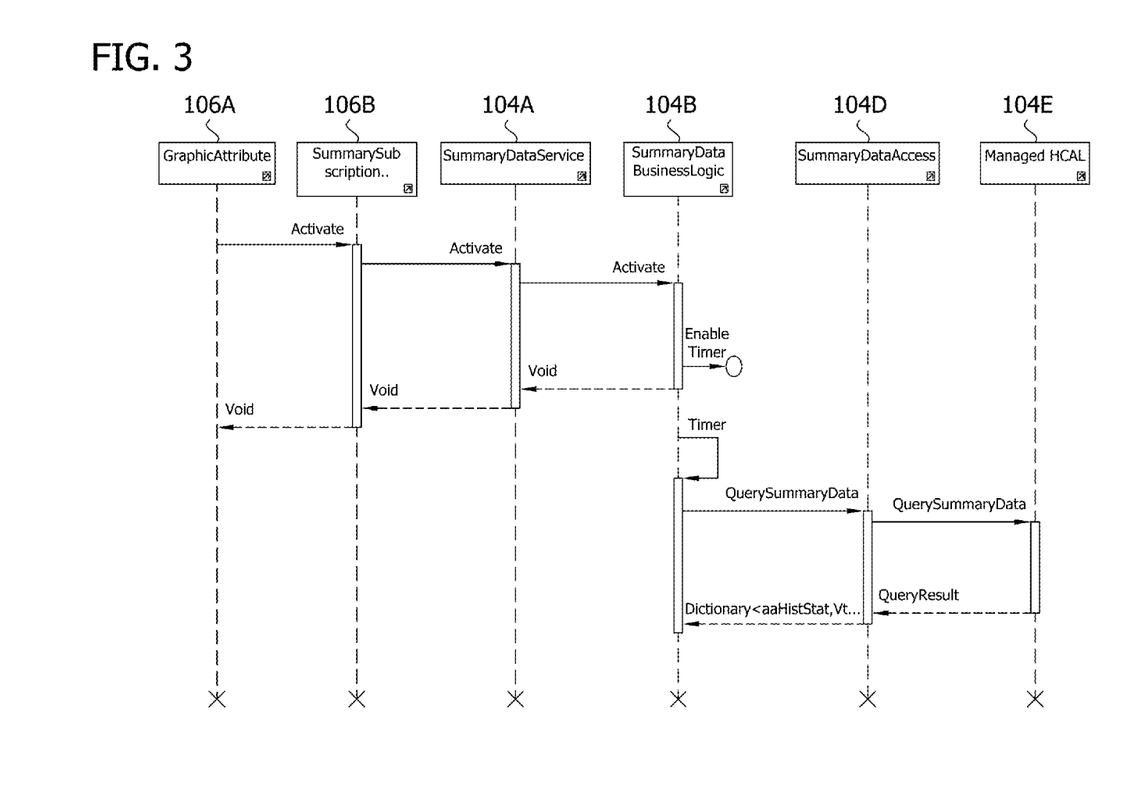
FIG. 3 is a sequence diagram of an activation message being sent and processed.

FIG. 3 shows an exemplary sequence diagram of an activation message being sent from the client 106 to the historian device 103 and being processed by the historian connection module 104. The client device 106 in the illustrated embodiment sends an activation message as defined by the graphic attribute module 106A and the summary subscription manager 106B to activate the process of receiving data to which the client device is subscribed. The activation message is sent to the historian connection module 104 via the network. The summary data service module 104A of the historian connection module 104 in the illustrated sequence records that the subscription has been activated. The summary data business logic module 104B of the historian connection module 104 enables a timer that causes a query to be periodically sent from the historian connection module 104 to the historian server module 102. The query as defined by the summary data access module 104D and the client managed module 104E obtains updated values for the data stored in the memory storage devices 102B that has been activated. Additionally, the client device 106 is configured to enable a timer as well, which indicates when the client device 106 may periodically send a refresh request message to the historian connection module 104 for updated values for the activated data.

Figure 4:
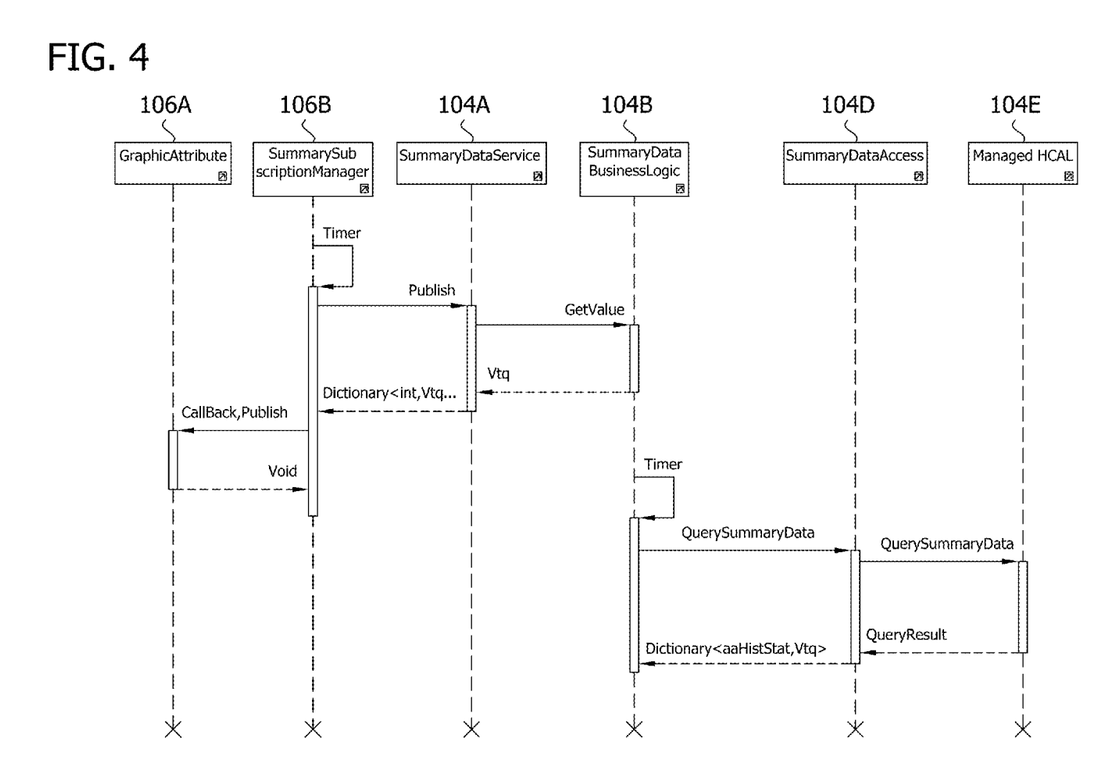
FIG. 4 is a sequence diagram of a refresh request message being sent and processed and a query message being processed.

FIG. 4 shows an exemplary sequence diagram of a refresh request message being sent from the client 106 to the historian device 103 and being processed by the historian connection module 104. The client device 106 in the illustrated sequence sends a refresh request message as defined by the graphic attribute module 106A and the summary subscription manager 106B to the historian connection module 104. The summary data service module 104A of the historian connection module 104 receives the refresh request message and responds by sending the client device the most up to date values for the data that has been requested. The summary data business logic module 104B of the historian connection module stores the data values it has received as defined by the summary data access module 104D and the client managed module 104E from the historian server module 102 in, for example, a dictionary or cache of memory storage device 104F and holds onto those values until they have been updated by another query to the historian server module 102. In this way, when the client device 106 requests refreshed data, the historian connection module 104 does not query the historian server module 102 and wait for a response. The historian connection module 104 provides the client device 102 with the values of the data currently stored in the dictionary or cache of memory storage device 104F by the summary data business logic module 104B of the historian connection module 104.

Referring further to the embodiment of FIG. 4, the query to the historian server module 102 by the historian connection module 104 is asynchronous to the refresh request by the client device 106. Data that has been subscribed to and activated may result in a timer being started by the summary data business logic module 104B of the historian connection module 104. The timer indicates when a query is made for updated data to the historian server module 102 periodically. The asynchronous nature of the refresh request and query to the server module 102 ensures that the client device 106 has access to recent data values without waiting for a response from the historian server module. The query process includes, for example, the historian server module processing raw data that has been stored to provide statistical data to the historian connection module. If the data requested is an average or minimum value or the like, the historian server module 104 is configured to calculate the values from the stored raw data present on the server module 102 as needed. Other processing may also be done by the historian server module 102 as necessary to provide the historian connection module 104 and the client device 106 with the desired statistical information.

Upon reception of the statistical data or information from the historian connection module 104, the client device 106 is configured to publish the received data or information to the display device 106G for observation by users. The published data is updateable each time the data is refreshed. The graphic attributes module 106A and the graphics library 106C as edited by the user via the graphic editor module 106B are further configured to determine how the data is portrayed on the display device 106G, which includes, for example, data values, graphs, icons, animations, and/or the like. The display device 106G may also display other information about the process alongside the published statistical data.

Figure 5:
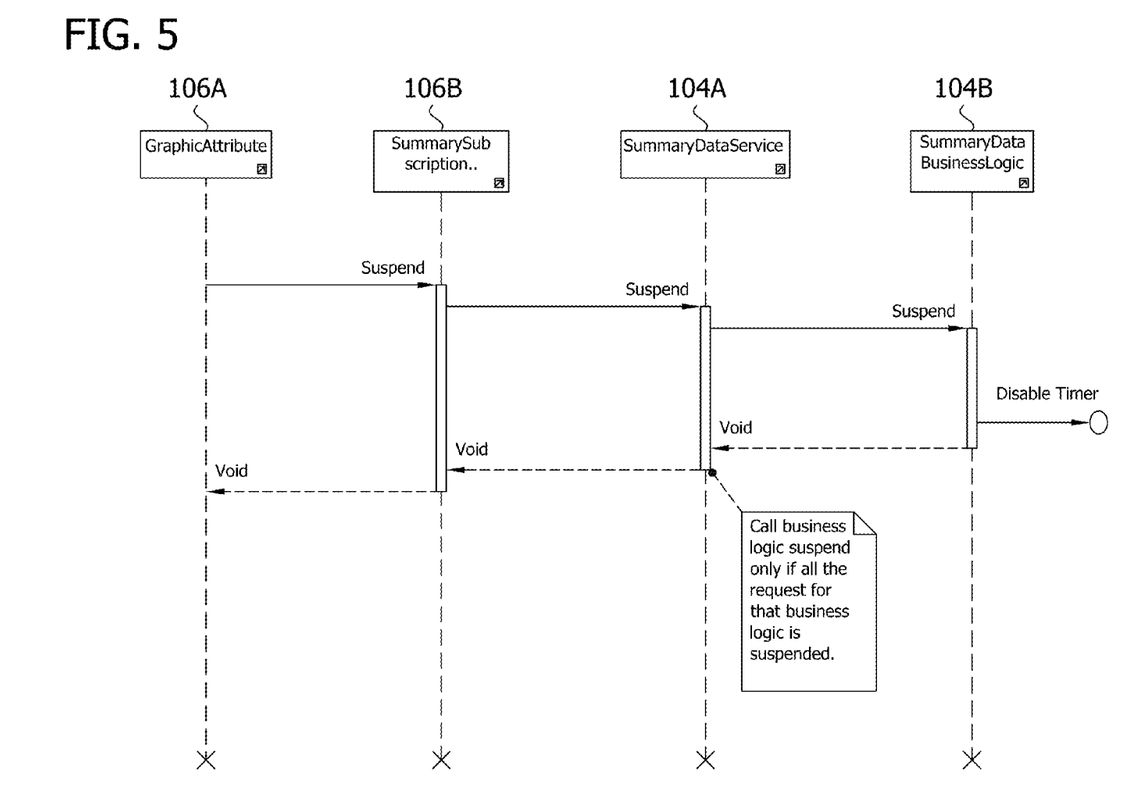
FIG. 5 is a sequence diagram of a suspend message being sent and processed.

FIG. 5 shows an exemplary sequence diagram of a suspend message being sent from the client 106 to the historian device 103 and being processed by the historian connection module 104. The client device 106 in the illustrated embodiment is configured to send a suspend message as defined by the graphic attribute module 106A and the summary subscription manager 106B to the historian connection module 104 to stop the historian device 103 from sending updated results temporarily. Upon receiving the suspend message, the summary data service module 104A of the historian connection module 104 stops sending queries to the historian server module 102 for that particular data or information. In an embodiment, the summary data business logic 104B of the historian connection module 104 disables a timer that indicated when to send a query to the historian server module 102. The historian connection module 104 is connectable to more than one client device or can have multiple subscriptions and activations of the suspended data. If the data requested to be suspended is still necessary for another active subscription or client device, the historian connection module 104 will not suspend querying to the historian server module 102 for that data. Instead, it will merely track that the initial client device 106 has requested the suspension of that data request.

Figure 6:
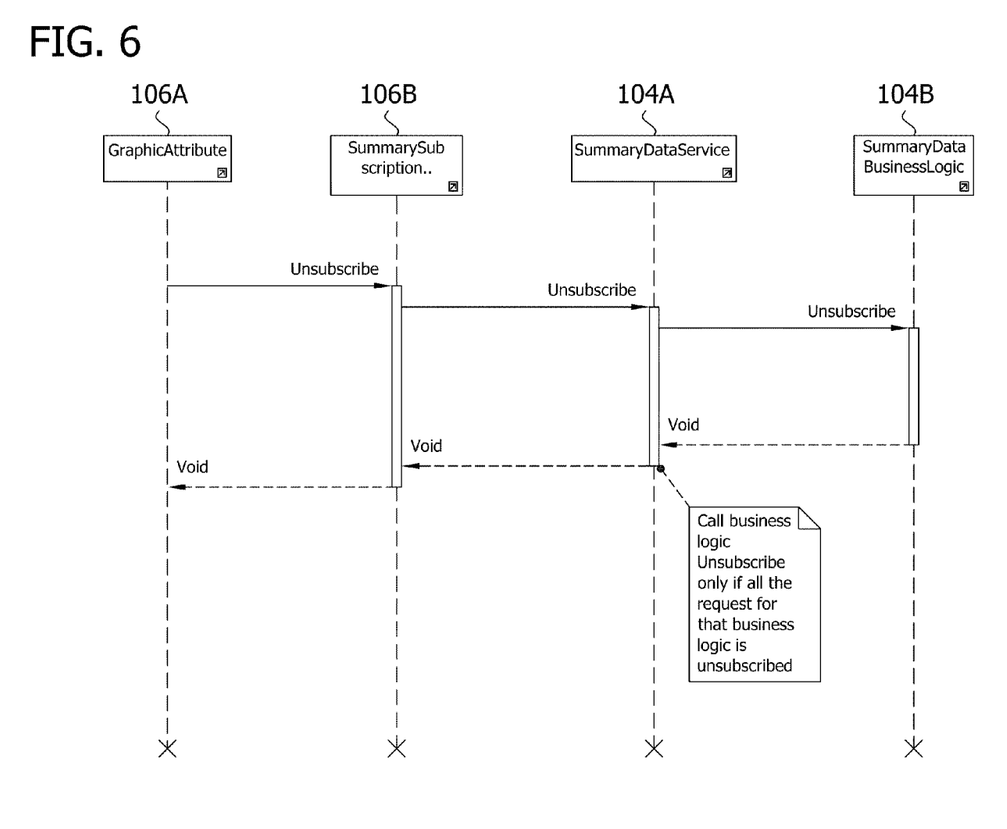
FIG. 6 is a sequence diagram of an unsubscribe message being sent and processed.

FIG. 6 shows a sequence diagram of an unsubscribe message being sent from the client 106 to the historian device 103 and being processed by the historian connection module 104. The client device 106 is configured in the illustrated embodiment to send an unsubscribe message as defined by the graphic attribute module 106A and the summary subscription manager 106B to the historian connection module 104 to stop the historian device 103 from sending updated results permanently. Upon receiving the unsubscribe message, the historian connection module 104 stops sending queries to the historian server module 102 for that particular data or information. The summary data business logic 104B of the historian connection module 104 is further configured to disable a timer that indicates when to send a query to the historian server module 102 if it has not already been suspended. The historian connection module 104 is connectable to more than one client device or can have multiple subscriptions and activations of the suspended data. If the data requested to be suspended is still necessary for another active subscription or client device, the historian connection module 104 will not suspend querying to the historian server module 102 for that data. Instead, it will merely track that the initial client device 106 has requested to unsubscribe to that data. In order to access the data again, the client device may subscribe to the data again as described above.

The data being requested from the historian device 103 comprises, for example, statistical summary data describing behavior of the process. This summary data includes analog summary data, state summary data, or the like. Analog summary data includes values such as the average of calculated values over a period of time. Table 1 contains some additional examples of analog data values.

TABLE 1

ANALOG DATA VALUES

| AGGREGATE FUNCTION NAME | VALUE | TIME |
|---|---|---|
| Average | A time-weighted average calculated from values within the summary period. | Summary Period end time. |
| First | The first value that occurs within the summary period. | The actual timestamp of the first value occurrence within the summary period. |
| Last | The last value that occurs within the summary period. | The actual timestamp of the last value occurrence within the summary period. |
| Maximum | The first maximum value that occurs within the summary period. | The actual timestamp of the first maximum value occurrence within the summary period. |
| Minimum | The first minimum value that occurs within the summary period. | The actual timestamp of the first minimum value occurrence within the summary period. |
| StdDev | A standard deviation calculated from values within the summary period. | Summary Period end time. |

TABLE 1-continued

ANALOG DATA VALUES

| AGGREGATE FUNCTION NAME | VALUE | TIME |
|---|---|---|
| Integral | An integral value calculated from values within the summary period. | Summary Period end time. |
| Count | A value count calculated from values within the summary period. | Summary Period end time. |
| PercentGood | Percentage of values with good quality calculated from values within the summary period. | Summary Period end time. |

The client device 106 can request summary data for a tag by passing the reference name as static text, expression, or reference, aggregate function name, and duration. The historian device 103 will return the value, time, and quality for one cycle. Value and time differs based on what type of aggregate function is requested, as shown in Table 1.

Summary data may also comprise state data, which includes data such as a count of the number of times a state occurs in a time period. Table 2 includes some other exemplary state summary functions.

TABLE 2

EXEMPLARY STATE SUMMARY FUNCTIONS

| Function | Value (Aggregate Function Name) |
|---|---|
| Count | Number of times the state occurred and completed within the summary period. Partial state will not be counted. (StateCountContained) |
| Average | Average time the state occurred and completed within the summary period. Partial state will be ignored for average calculation. (StateTimeAvgContained) |
| Total | Total time the state occurred within the summary period. (StateTimeTotal) |
| Maximum | Maximum time the state occurred within the summary period. (StateTimeMax) |
| Minimum | Minimum time the state occurred and completed within the summary period. Partial state will be ignored for minimum time calculation. (StateTimeMinContained) |
| Percent | Percentage of time the state occurred within the summary period. (StateTimePercent) |

Aspects of the invention permit a new custom property data type to be created for summary data (e.g., "HistorySummary") based on the history transferred from the historian device 103 to the client 106. A graphic attribute dialog box permits creation of specific summary data and the necessary queries. The necessary query parameters include, for example, the parameters listed in Table 3.

TABLE 3

QUERY PARAMETERS

| Parameter | Description |
|---|---|
| Reference Name | It is the reference name of the process variable for which the statistical data to be required. It can be Static text or Expression or Reference. |
| HistoryStat | It is one of the valid aggregate name defined in Table 1 or Table 2. Valid values can be selected from aaHistoryStat enum (refer enum in FIG. 1). |
| StartTime | The start time of the summarization period. When used, the end time will be "startTime + minutes" and when omitted, the start time will be |

TABLE 3-continued

QUERY PARAMETERS

| Parameter | Description |
|---|---|
| | "currentTime – minutes". |
| Minutes | It is the time in minutes which defines the cycle interval for which the data to be summarized. |
| AnalogState | Integer State value for which the statistical data to be summarized. It is required only for state summary query. |
| StringState | String State for which the statistical data to be summarized. It is required only for state summary query. |

The time period for summary data includes, for example, a start time and an end time as desired by the user. If a start time is not specified, the start time assumes that the end time is the current time and the start time is the current time less the specified duration. If a start time is specified, then the period is the specified duration of time from the specified start time.

Figure 7:
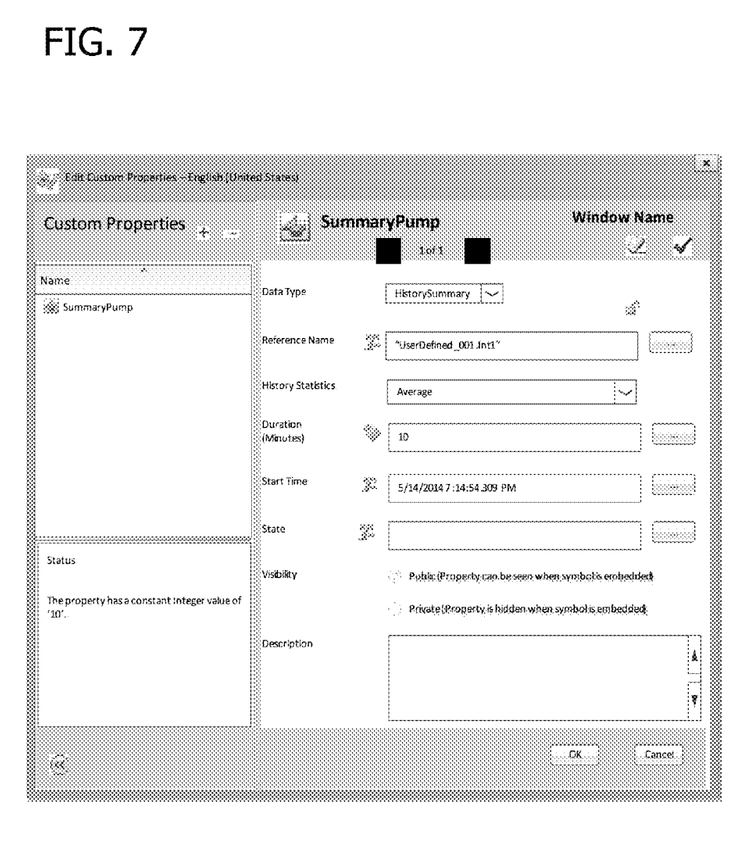
FIG. 7 is an exemplary screenshot of a graphic attribute dialog for defining a summary.

FIG. 7 is an exemplary screenshot of a graphic attribute dialog for defining a summary. The dialog includes, for example, the data type, which shows HistorySummary in this case. The user may give the summary a reference name to refer to the summary in the future. The summary has, for example, a History Statistics type, shown here as average. This type could also be any of the examples listed above. The summary is configurable by the user to define duration and a start time. In addition, the summary is configurable by the user to define a state for the summary, define its visibility (private or public), and include a description. State may be empty. If state is empty, the summary will be considered an analog summary. If a string value is provided, then a string state summary will be queried. If an integer value is provided, then an integer state summary will be queried.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices.

Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and process without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

The Abstract is provided to help the reader quickly ascertain the nature of the technical disclosure. It is submitted with the understanding that it will not be used to interpret or limit the scope or meaning of the claims.

What is claimed is:

1. A system for displaying statistical data in a process control environment, the system comprising:
   a client device;
   a historian device comprising a first historian memory storage device, a second historian memory storage device, and a historian processor, said first historian memory storage device storing processor-executable instructions for execution by the historian processor for implementing a historian connection module coupled to the client device via a network, and said first historian memory storage device including a cache, and said second historian memory storage device storing statistical data and processor-executable instructions for execution by the historian processor for implementing a historian server module, said processor-executable instructions configured for, when executed by the historian processor:
   receiving a connection, by the historian connection module via the network, from the client device;
   forming a connection between the historian connection module and the historian server module;
   receiving a subscription from the client device, by the historian connection module via the network, to statistical data stored in the historian server module;
   storing, by the historian connection module, the received subscription;
   receiving, by the historian connection module, an activation, from the client device via the network, of a data request for statistical data to which the client device is subscribed;
   receiving, by the historian connection module, a refresh data request from the client device via the network to refresh the statistical data to which the client device is subscribed;
   sending result data values from the historian connection module to the client device via the network in response to receiving the refresh data request without querying the historian server module, said result data values comprising values of the statistical data stored in the cache of the first historian memory storage device;

querying, by the historian connection module via the formed connection, the historian server module with an update data request for statistical data to which the client device is subscribed, wherein said querying is asynchronous to the refresh request from the client device;

processing, by the historian server module, the update data request from the historian connection module;

sending results of the processed update data request from the historian server module to the historian connection module via the formed connection; and updating, by the historian connection module, the cache of the first historian memory storage device to include the received results from the historian server module;

wherein the client device comprises a client memory storage device, a client processor, and a display device, said client memory storage device storing processor-executable instructions for execution by the client processor, said processor-executable instructions configured for, when executed by the client processor:

establishing a connection, via a network, to the historian connection module;

subscribing, via the established connection to the historian connection module to statistical data stored in the historian server module;

activating, via the established connection to the historian connection module the statistical data to which the client device is subscribed;

refreshing, via the established connection to the historian connection module, a data request for statistical data to which the client device is subscribed; and publishing statistical data comprising the result data values on the display device.

2. The system of claim 1, further comprising instructions configured for suspending activated statistical data by when executed the client processor, the client processor sending a suspend message to the historian connection module and the historian connection module configured for suspending queries to the historian server module based on the statistical data in response to the suspend message.

3. The system of claim 1, further comprising instructions configured for unsubscribing to activated statistical data when executed by the client processor, the client processor sending an unsubscribe message to the historian connection module and the historian connection module configured for refraining from querying the historian server module on the statistical data and from sending results to the client device based on the statistical data in response to the unsubscribe message.

4. The system of claim 1, wherein the historian connection module starts a timer in response to receiving the activation and queries the historian server module periodically based on the timer.

5. The system of claim 1, wherein the statistical data comprises at least one of: summary data of analog values periodically updated over time from the process control environment, and summary data of states of the process periodically updated over time from the process control environment.

6. The system of claim 1, wherein the published statistical data on the display device comprises an animated effect.

7. A historian device for use with a client device for displaying statistical data in a process control environment, the historian device comprising:

a first historian memory storage device, a second historian memory storage device, and a historian processor, said first historian memory storage device storing processor-executable instructions for execution by the historian processor for implementing a historian connection module coupled to a client device via a network, said first historian memory storage device including a cache, and said second historian memory storage device storing statistical data and processor-executable instructions for execution by the historian processor for implementing a historian server module, said processor-executable instructions configured for, when executed by the historian processor:

receiving a connection, by the historian connection module via the network, from the client device;

forming a connection between the historian connection module and the historian server module;

receiving a subscription from the client device, by the historian connection module via the network, to statistical data stored in the historian server module;

storing, by the historian connection module, the received subscription;

receiving, by the historian connection module, an activation, from the client device via the network, of a data request for statistical data to which the client device is subscribed;

receiving, by the historian connection module, a refresh data request from the client device via the network to refresh the statistical data to which the client device is subscribed;

sending result data values from the historian connection module to the client device via the network in response to receiving the refresh data request without querying the historian server module, said result data values comprising values of the statistical data stored in the cache of the first historian memory storage device;

querying, by the historian connection module via the formed connection, the historian server module with at least one of the activation data request and a refresh data request for statistical data to which the client device is subscribed, wherein said querying is asynchronous to the refresh request from the client device;

processing, by the historian server module, the data request from the historian connection module;

sending results from the processed data request from the historian server module to the historian connection module via the formed connection; and updating, by the historian connection module, the cache of the first historian memory storage device to include the received results from the historian server module.

8. The historian device of claim 7, wherein the client device is configured for suspending activated statistical data, and wherein the client device sends a suspend message to the historian connection module, said historian connection module configured for suspending queries to the historian server module based on the statistical data in response to the suspend message.

9. The historian device of claim 7, wherein the client device is configured for unsubscribing to activated statistical data, and the client device sends an unsubscribe message to the historian connection module, said historian connection module configured for refraining from querying the historian server module on the statistical data and from sending results to the client device based on the statistical data in response to the unsubscribe message.

10. The historian device of claim 7, wherein the historian connection module starts a timer in response to receiving the activation and queries the historian server module periodically based on the timer.

11. The historian device of claim 7, wherein the statistical data comprises at least one of: summary data of analog values periodically updated over time from the process control environment, and summary data of states of the process periodically updated over time from the process control environment.

12. The historian device of claim 7, wherein the client device is configured for publishing statistical data comprising the result data values on a display device thereof, and wherein the published statistical data on the display device comprises an animated effect.

13. A method for displaying statistical data in a process control environment, the method comprising:

providing a client device, wherein the client device comprises a client memory storage device, a client processor, and a display device, said client memory storage device storing processor-executable instructions for execution by the client processor;

providing a historian device comprising a first historian memory storage device, a second historian memory storage device, and a historian processor, said first historian memory storage device storing processor-executable instructions for execution by the historian processor for implementing a historian connection module coupled to the client device via a network, said first historian memory storage device including a cache, and said second historian memory storage device storing statistical data and processor-executable instructions for execution by the historian processor for implementing a historian server module, said processor-executable instructions configured for, when executed by the historian processor:

receiving a connection, by the historian connection module via the network, from the client device;

forming a connection between the historian connection module and the historian server module;

receiving a subscription from the client device, by the historian connection module via the network, to statistical data stored in the historian server module;

storing, by the historian connection module, the received subscription;

receiving, by the historian connection module, an activation, from the client device via the network, of a data request for statistical data to which the client device is subscribed;

receiving, by the historian connection module, a refresh data request from the client device via the network to refresh the statistical data to which the client device is subscribed;

sending result data values from the historian connection module to the client device via the network in response to receiving the refresh data request without querying the historian server module, said result data values comprising values of the statistical data stored in the cache of the first historian memory storage device;

querying, by the historian connection module via the formed connection, the historian server module with an update data request for statistical data to which the client device is subscribed, wherein said querying is asynchronous to the refresh request from the client device;

processing, by the historian server module, the update data request from the historian connection module;

sending results of the processed updated data request from the historian server module to the historian connection module via the formed connection; and updating, by the historian connection module, the cache of the first historian memory storage device to include the received results from the historian server module; and said processor-executable stored on the client memory storage device configured for, when executed by the client processor:

establishing a connection, via a network, to the historian connection module;

subscribing, via the established connection to the historian connection module to statistical data stored in the historian server module;

activating, via the established connection to the historian connection module, the statistical data to which the client device is subscribed;

refreshing, via the established connection to the historian connection module, a data request for statistical data to which the client device is subscribed; and publishing statistical data comprising the result data values on the display device.

14. The method of claim 13, further comprising sending by the client device a suspend message to the historian connection module and suspending by the historian connection module queries to the historian server module based on the statistical data in response to the suspend message.

15. The method of claim 13, further comprising sending by the client processor an unsubscribe message to the historian connection module and refraining by the historian connection module from querying the historian server module on the statistical data and from sending results to the client device based on the statistical data in response to the unsubscribe message.

16. The method of claim 13, further comprising starting a timer by the historian connection module in response to receiving the activation and periodically querying the historian server module based on the timer.

17. The method of claim 13, wherein the statistical data comprises at least one of: summary data of analog values updated over time from the process control environment, and summary data of states of the process updated over time from the process control environment.

18. The method of claim 13, wherein the published statistical data on the display device comprises an animated effect.

* * * * *